*J. F. Brewer,*

*Coal Shovel.*

No. 100,008. Patented Feb. 22, 1870.

Witnesses.
C. Sheldon
Henry L. Hinman

Inventor.
James F. Brewer,
By James Shepard, Atty.

United States Patent Office.

JAMES F. BREWER, OF PLANTSVILLE, CONNECTICUT, ASSIGNOR TO HIMSELF AND S. STOW MANUFACTURING COMPANY, OF SAME PLACE.

Letters Patent No. 100,008, dated February 22, 1870.

IMPROVEMENT IN COAL-SHOVEL.

The Schedule referred to in these Letters Patent and making part of the same.

I, JAMES F. BREWER, of Plantsville, in the county of Hartford, and State of Connecticut, have invented a new and useful Improvement in Coal-Shovels, of which the following is a specification.

My invention consists in the combination of a sheet-metal pan and a cast-metal shank cast onto the pan.

In the accompanying drawings—

Figure 2:
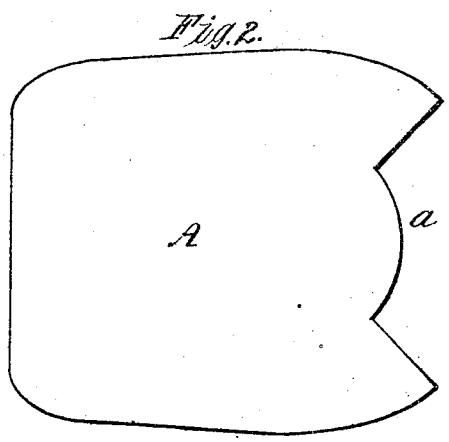
Figure 2 is a plan view of the blank for forming the pan.

The pan or blade A is first blanked out with a portion of the same cut way, thus forming the recess $a$, shown in fig. 2.

The pan is formed in ordinary swaging-dies, while the recess $a$ liberates the edge of the metal composing the pan A, which would otherwise be contracted and wrinkled in swaging, whereby I am enabled to swage a very smooth pan.

As usual in casting one article onto another, a pattern is made of the form of both of the parts, and its imprint taken in a mold.

Figure 1:
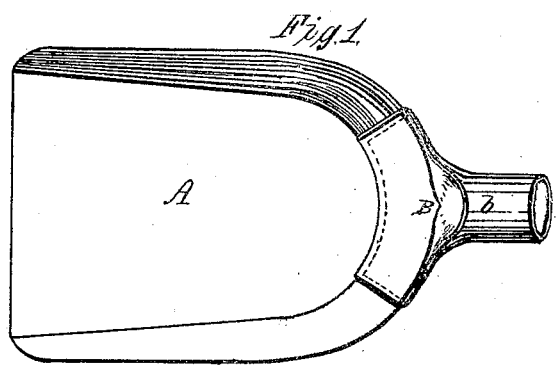
Figure 1 is a front elevation of my invention.

The pan A, formed as before described, is placed in the mold, where the shank B is cast firmly onto the same, the cast metal filling the aperture or recess $a$, and extending a short distance over the edge of the sheet metal, as indicated by broken lines in fig. 1.

In the drawings the shank B is provided with a socket, $b$, to receive a wood handle, but the style of handle and the manner of securing the same to the shank B are immaterial to my invention.

Although I prefer to cut the aperture or recess $a$ in the form substantially as shown, for the purpose of obtaining a neatly-swaged pan, the aperture may be made of any other form which will allow the metal of the shank B to cast firmly onto the pan A.

The weakest point in ordinary sheet-metal shovels is the part near the shank, which is generally secured by rivets, which often tear out before the utility of the article is otherwise impaired.

In cast-metal shovels the weight is objectionable, while the thinness of the cast-metal pan makes it very liable to break.

By my invention all the objections to the ordinary styles of coal-shovels are entirely overcome.

I claim as my invention—

As a new article of manufacture, a shovel, consisting of the sheet-metal pan A and cast-metal shank B, cast onto the pan A, substantially as described.

JAMES F. BREWER.

Witnesses:
JAMES SHEPARD,
ORSON W. STOW.